United States Patent [19]

Saito et al.

[11] Patent Number: 4,862,293
[45] Date of Patent: Aug. 29, 1989

[54] STILL VIDEO ADAPTER

[75] Inventors: Mitsuru Saito, Ibaraki; Kaoru Umeda, Sennan; Tetsuyuki Tanimoto, Takatsuki, all of Japan

[73] Assignee: Minolta Camera Kabushiki Kaisha, Osaka, Japan

[21] Appl. No.: 90,912

[22] Filed: Aug. 31, 1987

[30] Foreign Application Priority Data

Aug. 30, 1986 [JP] Japan .................................. 61-205002
Feb. 20, 1987 [JP] Japan .................................. 62-38327

[51] Int. Cl.$^4$ ............................................ H04N 5/781
[52] U.S. Cl. .................................... 360/35.1; 358/342; 358/906
[58] Field of Search ............... 358/335, 906, 909, 342; 360/33.1, 35.1

[56] References Cited

U.S. PATENT DOCUMENTS 4,420,773 12/1983 Toyoda et al. ...................... 358/906
4,584,598 4/1986 Kutaragi ............................. 358/906
4,717,969 1/1988 Miyake ................................. 358/906

FOREIGN PATENT DOCUMENTS 58-77802 5/1983 Japan .
59-104132 7/1984 Japan .

Primary Examiner—Donald McElheny, Jr.
Attorney, Agent, or Firm—Burns, Doane, Swecker & Mathis

[57] ABSTRACT

A still video adapter is attached to the body of a standard photographic camera, in place of the back cover of the camera, to enable picture taking on a magnetic disk, being provided with a deck portion extending from one side to the front of the adapter to hold a magnetic disk in parallel with the side of the adapter.

19 Claims, 13 Drawing Sheets

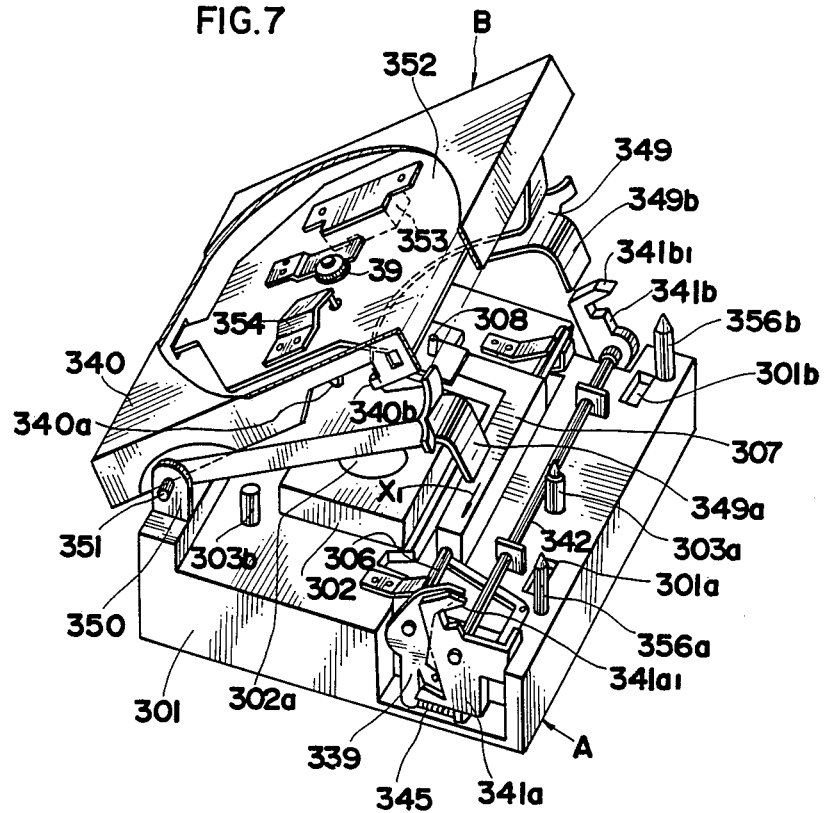
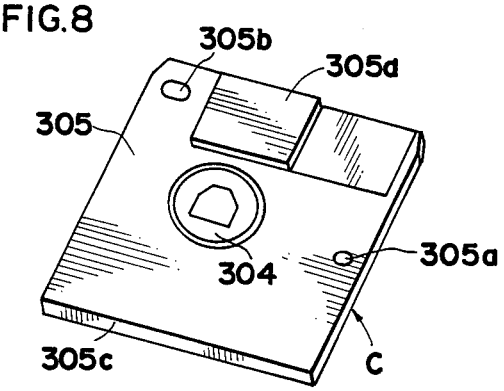

STILL VIDEO ADAPTER

BACKGROUND OF THE INVENTION

1. Field of the Invention

The present invention relates to an adapter attached to the back of a camera body (which was designed for use with an ordinary silver halide film) in place of the back cover of the camera to enable video pictures to be stored on a magnetic disk.

2. Description of the Prior Art

Up to now, there have been proposed still video cameras which were designed specifically for picture taking on a magnetic disk. Such video cameras usually have an image pick-up device located at the focal plane of the camera in the rear of the objective lens, and a deck portion at the back thereof to receive a magnetic disk.

However, such an arrangement of the video camera is inconvenient if it is to be employed in an adapter, as intended in this invention. The image pick-up plane of the still video camera cannot have a large size because of its high cost per area. Accordingly, cameras for use with a silver halide film have a larger picture frame size (i.e. the size of the frame of the film) than the image pick-up plane of the still video cameras. The still video cameras are designed with a flange-back adapted for such an image pick-up plane, and have a large depth dimension (from back to front).

Thus, the depth dimension will be extremely large if a still camera is coupled (in place of the rear cover) with a still video adapter constructed for a conventional still video camera, wherein the image pick-up device is located on the focal plane in the rear of the objective lens and the deck portion which receives the magnetic disk is located in the rear of the image pick-up device, because the depth dimension of the adapter is added to the depth dimension of the camera body.

Additionally, if a small image pick-up plane is located in the image plane of the camera for use with silver halide film, the angle of view will be too small. Accordingly, it is necessary for a still video adapter to have the image pick-up plane located out of the image plane of the camera, with the light from the object being photographed being transmitted through a optical relay system to the image pick-up plane, resulting in further bulkiness in the image pick-up device and also the entire body.

SUMMARY OF THE INVENTION

An object of the present invention is to provide a still video adapter arranged to be as compact as possible when it is coupled with a camera body.

To attain the above object, a still video adapter according to the present invention is attached to the camera body or normal use with a silver halide film, in place of the back cover of the camera,, to enable picture taking on a magnetic disk, being provided with a deck portion extending from one side to the front of the adapter to hold a magnetic disk in parallel with the side of the adapter.

According to the present invention, the deck portion is arranged to extend from one side to the front of the still video adapter which is attached to the camera body (which is normally used with a silver halide film) in place of the back cover of the camera to enable picture taking on a magnetic disk with such a camera. As a result, the depth (back-to-front) dimension of the adapter is smaller by the dimension of the deck portion, making the entire body compact.

BRIEF DESCRIPTION OF THE DRAWINGS

These objects and other objects, features, aspects and advantages of the present invention will become more apparent from the following detailed description of the present invention when taken in conjunction with the accompanying drawings.

FIGS. 3(a)-(c) show the same embodiment and a camera to be coupled with the still video adapter of the embodiment, wherein FIG. 3(a) is a front elevation view of the camera and its accessories, FIG. 3(b) is a front elevation view of the still video adapter, and FIG. 3(c) is a side elevation view of one of the above mentioned accessories.

FIG. 7 is a partial cutaway perspective view of the deck portion of the embodiment;

FIG. 8 is a perspective view of the cassette containing the magnetic disk to be used in the embodiment;

DETAILED DESCRIPTION OF THE PREFERRED EMBODIMENTS

Figure 2:
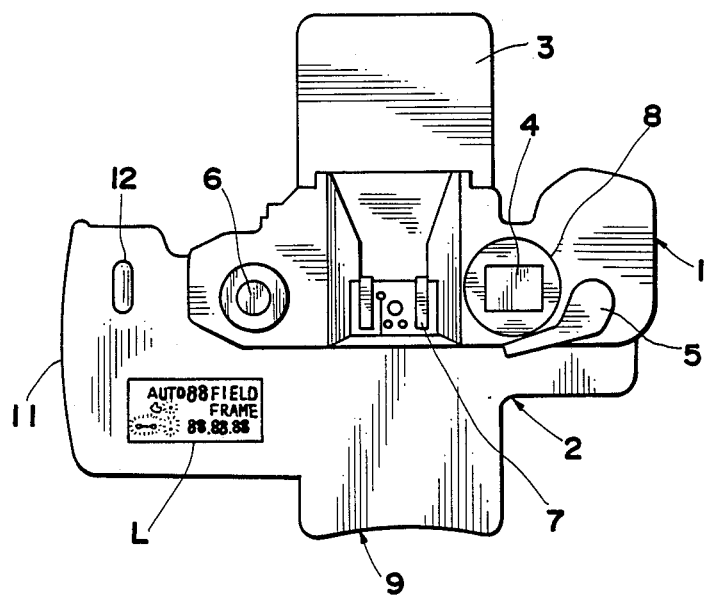
FIG. 2 is a plane view of the embodiment.

In the following, explanations will be made about the preferred embodiment of the preset invention with reference to the attached drawings. First, explanations will be made about the general construction of the embodiment with reference to FIGS. 2 through 5. FIG. 2 is a top plane view of a still video back 2 (i.e. the still video adapter) attached to a single lens reflex camera body 1. An interchangeable lens 3 is attached to the front of the camera body 1 which in turn is provided on its top with an exposure display window 4, a winding lever 5, a rewinding knob 6, an accessory shoe 7 for coupling with an electronic flash device or strobe, an exposure mode setting dial 8 and others.

The still video back 2 is provided with a viewfinder window 9 through which the light from the viewfinder of the camera body 1 is relayed. The still video back 2 is further provided with a cassette receiving portion 11 which holds a magnetic disk cassette (or a magnetic disk cassette) C shown in FIG. 8 inserted therein, and a cassette eject button 12 which is operated to remove the cassette. A display portion L on the top of the still video back 2 has a function to provide various indications such as an indication of a white balance adjusting mode, a counter value indication to indicate the recorded track of the still video, an indication of whether the field recording mode or the frame recording mode is selected, and an indication of clock. The indication of the white balance adjusting mode is changed in response to each depression of a change-over switch in the order of automatic, manual (for blue sky illumination), manual (for cloudy sky illumination), manual (for fluorescent lamp illumination), manual (for tungsten lamp illumination), manual (for strobe light illumination) and then back to automatic. During automatic white balance adjustment, this indicates which white balance setting is being used (such as blue sky, cloudy sky, or artificial lights).

Figure 3A:
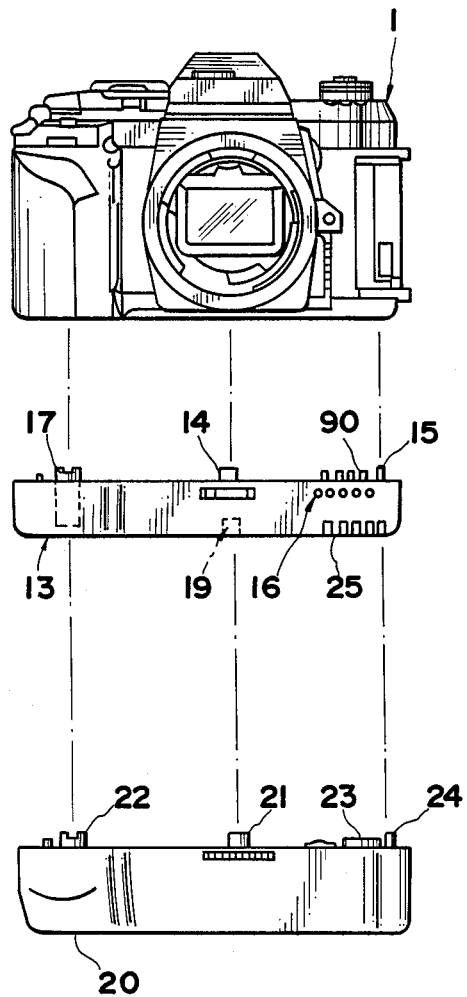

Next, explanation will be made with reference to FIG. 3 about the relationship between the camera body 1, the still video back 2 and a battery case.

Camera body 1 has a tripod screw hole located underneath and electric terminals for the exchange of signals between the camera body 1 and a bracket type strobe which can be attached to the bottom of the camera body 1 and secured by a screw threaded into the tripod screw hole. The back of the camera body 1 is provided with a rear cover which is opened and closed for loading and unloading the film. The rear cover can be replaced with an optional function back which has functions of data imprinting, interval timer exposure, exposure calculation, etc. Such a function back usually includes an electric circuit which is required to exchange signals with the circuit in the camera body 1 when the function back is coupled with the camera body in place of its rear cover. To this end, the camera body 1 is provided with terminals for the signal exchange which are exposed when the rear cover is removed. The terminals are brought into contact with the terminals of the optional function back to enable the signal exchange when the function back is attached to the camera body 1.

A motor driven winding device 20 may be attached directly to the bottom of the camera body 1 by a tripod screw 21. Pin 24 locates the relative position of the camera body 1 and the motor driven winding device 20. Electric terminals 23 are brought into contact with the terminals on the bottom of the camera body 1 which were referred to in the above as the terminals for signal exchange with a bracket type electronic flash device. The electric terminals 23 in contact with the camera body terminals enable signal exchange with the camera body for the control of motor driven winding functions. A winding shaft 22 is engaged with the winding shaft at the bottom of the camera body 1 to enable film winding and shutter cocking by means of the motor driven winding device 20.

The still video back 2 of the still video adapter is attached to the back of the camera body 1 in place of its rear cover in the same manner as the optional function back is attached to the camera body. Terminals 26 are provided below the picture frame 2a on the front or inner plane of the still video back 2 to enable signal exchange with the camera body 1 as in the case of the optional function back such that the functions provided in the camera body 1 interact with the functions provided in the still video back 2. It is to be noted that the signals exchanged between the camera body 1 and the still video adapter 2 do not include timing signals for flash photography such as for the control of the timings of flash firing, stopping the flash, etc.

A battery case 13 supplies power to the still video back 2 and is formed separately from the latter. The battery case 13 is attached to the bottom of the camera body 1 while the still video adapter 2 is attached to the back. During separate attachment to the camera body, the electric connection for power supply is to be completed between the battery case 13 and the still video back 2.

The battery case 13 is attached to the bottom of the camera body 1 by a tripod screw 14 as in the case of the motor driven winding device 20. When the battery case 13 is in use, the motor driven winding device 20 is coupled to the camera body 1 through the battery case 13. Pin 15 locates the relative position for attachment of the battery case 13 to the camera body. Terminals 90 (a row of pins) are to be brought into contact with the terminals on the bottom of the camera body 1 to enable signal exchange as is done between the camera body and the bracket type electronic flash device. In other words, the terminals 90 receive from the camera body 1 timing signals for firing the flash, stopping the flash, etc. As can be seen in the side elevation view of FIG. 3(c), the battery case 13 is provided on its rear with electric terminals 16 (a row of pins) which include a power supply terminal for the still video back 2 and signal terminals for transmitting to the still video back the timing signals fed through the electric terminals 90 for the timing control of flash photography.

The battery case 13 is also formed with a tripod screw hole 19 which is engaged by the tripod screw 21 on the motor driven winding device 20. With this screw, the motor driven winding device 20 may be coupled to the camera body 1 via the battery case. An intermediate shaft 17 is provided for such coupling and transmits the rotation of the winding shaft 22 of the motor driven winding device 20 to the winding shaft of the camera body 1. Terminals 25 transmit the signals fed to terminals 90 from the camera body 1 to the terminals 23 of the motor driven winding device 20.

Figure 3B:
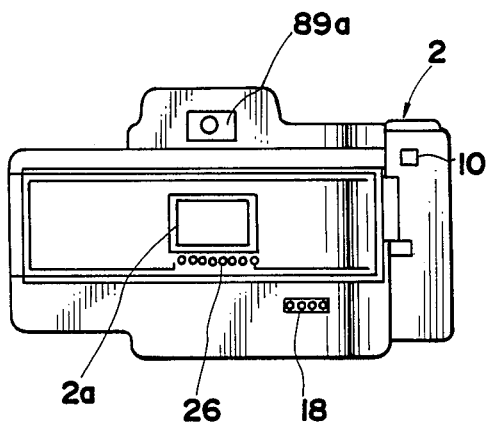

At the upper right corner of the still video back 2 (as viewed from the front) is a white balance light receiving window 10, as shown in FIG. 3(b), to enable white balance adjustment in accordance with the light monitored through the window 10.

With the above construction, when the rear cover is removed from the camera body 1 and the battery case 13 is attached to the bottom of the camera body, the electric terminals of the camera body 1 and the electric terminals 16 of the battery case 13 are exposed and located at the back of the integrated body. Accordingly, in addition to the electric terminals 26, the still video back 2 is provided with a row of dot pattern electric terminals 18 on its front or inner plane at the location corresponding to the electric terminals 16. The electric terminals 16 come into contact with the row of dot terminals 18. Through this contact, the still video back 2 receives from the battery case 13 not only the power supply but also timing signals for flash photography that are not supplied directly through the terminals 26. In this way, the still video back 2 is easily coupled to the camera body 1 with the electric connection being attained from the power supply to perform the functions of the still video back as well as for the data exchange for the interaction of the still video back with the camera body. A power source unit (not shown) is attached to the bottom of the motor driven winding device 20 for its power supply.

Figure 4:
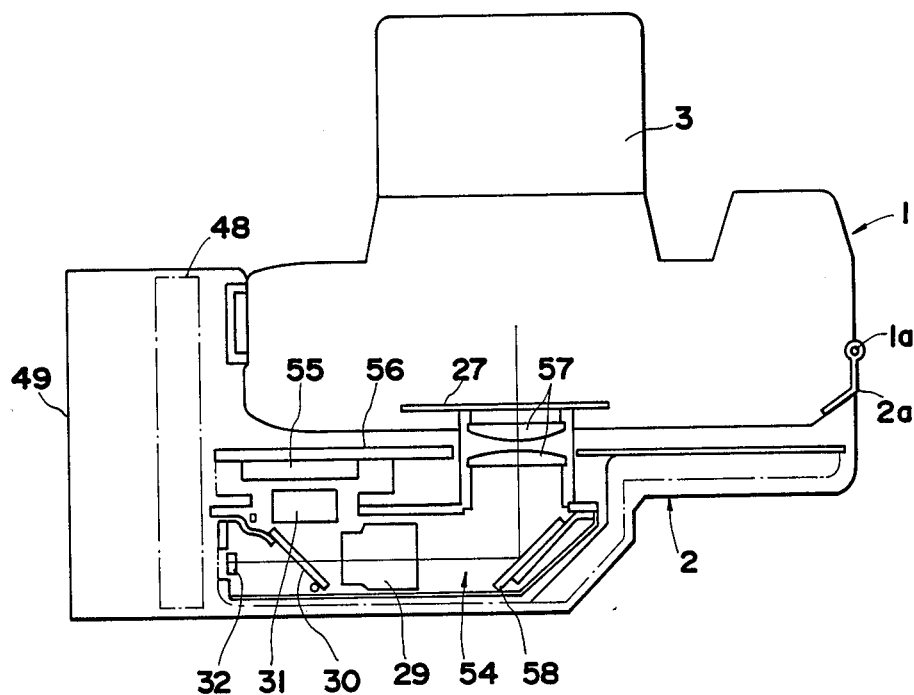
FIG. 4 is a horizontal cross section view of the embodiment.

Next, a brief explanation will be made about the internal structure of the still video back 2 with reference to FIG. 4. The still video back 2 comprises an optical relay system 54 with the front end facing the exposure window of frame 27 of the camera body 1 and which functions to project the 35 mm size image in the camera body 1 onto a CCD size image pick-up plane (for example ⅔ inches) to reduce the size of the image. The still video back 2 also comprises a CCD signal processing circuit board 56 including a CCD sensor 55. The relay optical system 54 is composed of a condenser lens 57, a reflecting mirror 58 for bending the light path by about 90 degrees and directing the light sideways, an image forming lens block 29, a semitransparent mirror 30 to fold the picture light path by a further 90 degrees and direct the light forward, and an optical low pass filter 31. Through the optical relay system 54, the image of the object to be photographed which is in the film plane in the camera is reduced to about half its original size and projected onto the CCD sensor 55 which faces the rear. In the rear of the half mirror 30 is a light receiving element 32 for flash light control. With reference to FIG. 4, the still video back 2 is further provided with a circuit board 48 for various recording circuits as described later, and a floppy deck 49 that comprises a recording mechanism system.

Figure 5:
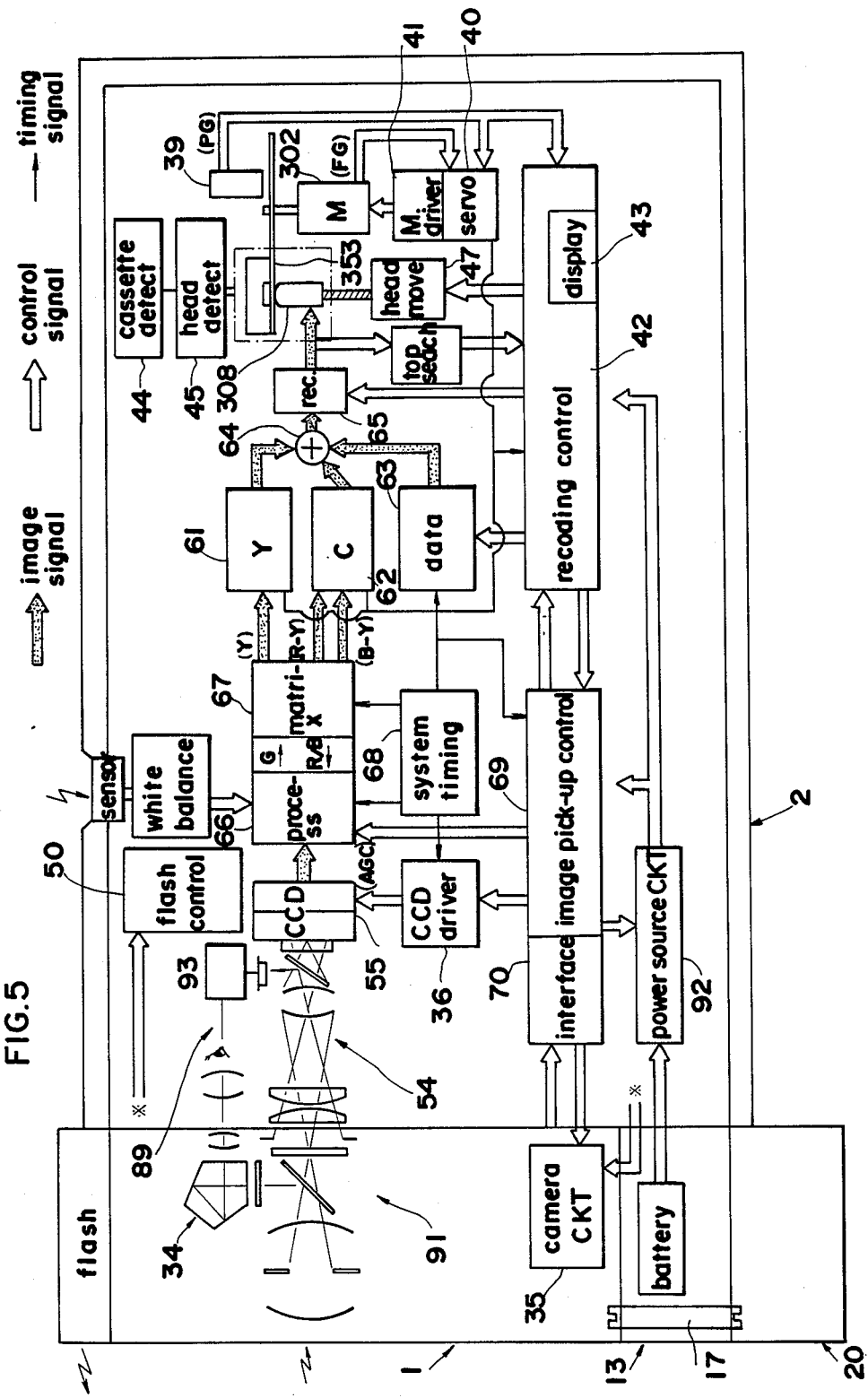
FIG. 5 is a block diagram showing the circuit construction of the embodiment.

FIG. 5 is a block diagram showing the general construction of the still video camera system. As described earlier, the system is composed of the camera body 1 and a still video back 2, with the camera body 1 comprising a picture taking optical system 91 including an objective lens, a diaphragm mechanism, a shutter mechanism, and an exposure control mechanism for controlling the latter two mechanisms; a viewfinder optical system 34 including a reflex mirror, a focusing plate, a pentagonal prism, an eyepiece and others; and a camera circuit 35 for controlling the general operation of the camera body.

The still video back 2 comprises the optical relay system 54, a relay viewfinder system 89, the CCD sensor 55 including a photoelectric converter section and a signal transfer section, and a signal processing circuit.

The signal processing circuit for the CCD sensor 55 includes a CCD driver circuit 36 for transferring and outputting the image signals from the CCD sensor 55, a process circuit 66 for deriving G signal (green signal) and R/B signal (red/blue line sequential signal), a matrix circuit 67 for producing a brightness signal Y and color difference signals R-Y and B-Y, and a system timing circuit 68 for controlling the timing of the operations of those circuits.

An image pick-up control circuit 69 controls general operation of the still video back 2. The camera interface 70 receives serial data for shutter speed value Tvc, diaphragm aperture value Avc, object brightness value Bvc and others from the camera. It also receives signals from the camera light measuring switch, release switch, shutter closure completion detector switch, etc. and inputs data and signals to the image pick-up control circuit 69, and also sends back to the camera body 1 a release inhibit and other signals generated by calculations in the image pick-up control circuit 69.

The input/output terminals 26 of the camera interface are located as shown in FIG. 3(b) below the picture frame 2a of the still video back 2 and are to be connected with input/output terminals (not shown) of the camera body 1.

Figure 3C:
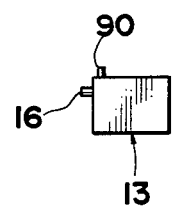

As described earlier, the electric terminals 90 and 16 on the battery case 13 shown in FIG. 3(c) are connected to the flash control terminals (not shown) on the bottom surface of the camera body 1 and the row of dot terminals 18 on the still video back such that the camera circuit 35 is electrically connected with the flash control circuit 50 in the still video back to enable the control of the electronic flash by the still video back.

The recording system includes a Y signal processing circuit 61 and a C signal processing circuit 62 for processing and adapting the brightness signal Y and the color difference signals (R-Y, B-Y) from the CCD signal processing circuit to the general standard for the still video floppy, respectively; and a data multiplexing circuit 63 to multiplex the data signal on the image signals. The data signals to be multiplexed on image signals include a signal for discriminating between field recording and frame recording, a track number signal, a date signal, etc.

The outputs of circuits 61, 62 and 63 are mixed by a mixer circuit 64 and supplied via recording circuit 65 to a magnetic head 308 for magnetic recording. The magnetic disk is driven and rotated by a spindle motor 302 at the rate of 3600 rpm in accordance with the general standard. The rotation rate of the spindle motor 302 is controlled by a PG (pulse generator) coil 39 which generates pulses proportional to the rotation of the motor, a servo circuit 40 and a driver circuit 41. A recording control circuit 42 controls the recording in accordance with control signals from the image pick-up control circuit 69. The recording control circuit 42 is provided with a display circuit 43.

The still video back 2 is provided with a mechanism to position the magnetic disk cassette with high precision. When the cassette is inserted and positioning is completed, a cassette insertion detector 44 generates a positioning detection signal. The still video back 2 also includes a head crash detector section 45, pad 353, and a head movement driving circuit 47.

The construction and operation of each part of the present embodiment will be described in detail with reference to the drawings.

Figure 1:
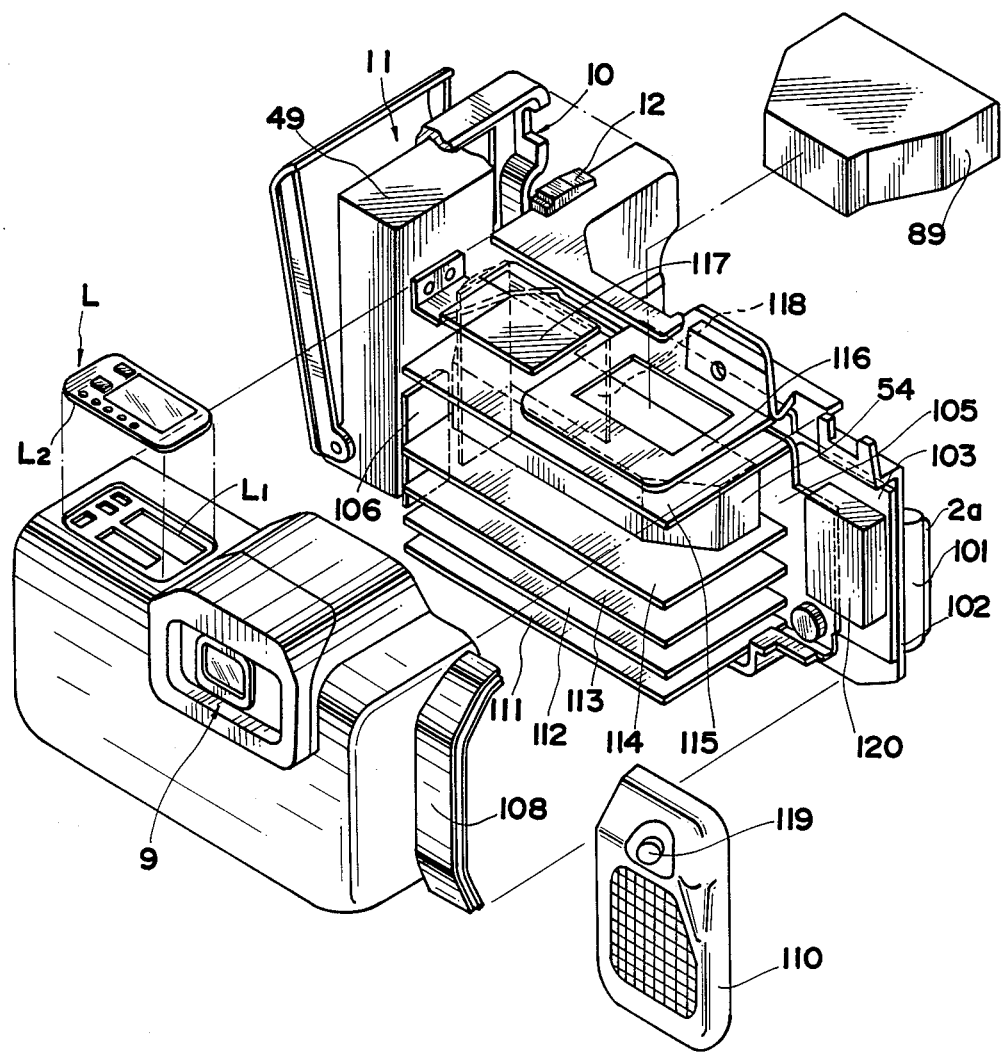
FIG. 1 is an exploded perspective view of an embodiment of the present invention.

First, with reference to FIG. 1, an explanation will be made about the detail of the location of circuit boards arranged within the still video back 2 according to the embodiment.

The still video back 2 comprises a rear cover portion 101, a front case 102 fixed to the rear cover portion 101, a reinforcing plate 103 fixed to the front case 102 to reinforce the latter to which various circuit boards are attached, a rear cover 108 fixed to the front case 102 to cover the reinforcing plate 103 and the various circuit boards arranged on the front case 102, and a back cover 110 which forms the rear portion covering with the rear cover 108 and also forms a grip to hold the camera. The rear cover portion 101 is provided on one side (the right side as viewed from the rear of the case of the embodiment) with an attachment structure 2a which engages the rear cover hinge portion 1a (see FIG. 4) which is provided on the camera body 1 for the attachment of the camera rear cover. The attaching structure 2a is coupled with the hinge portion in the same manner as the camera rear cover is attached to the camera body 1.

As was apparent from the description with reference to FIGS. 2 and 4, the still video back 2 is provided with a floppy deck 49 on the opposite side (left side as viewed from the rear of the still video back) to the attachment structure of the rear cover portion 101. The floppy deck 49 extends along the side of the still video back 2 to the front and reaches to the side of the camera body 1.

The floppy deck 49 is formed with a size adequate to accommodate the magnetic cassette disk to be loaded therein, but the above mentioned arrangement makes the entire shape attractive without any portion projecting unnecessarily to the front or rear. As the floppy deck 49 is on the opposite side to the attachment structure, the still video back 2 can be attached to and detached from the camera body 1 in the same manner as the camera rear cover, without being obstructed by the floppy deck 49. (The operation to attach and detach the still video back 2 will be described in detail later.) As shown in FIG. 1, the floppy deck 49 is provided with a deck cover which is located on the side of the deck and hinged at the bottom. With this structure the deck cover opens at the top which is very convenient for loading and ejecting the magnetic disk cassette while the camera is being held in a natural condition (or posture). (The internal structure of the floppy deck 49 will be described in detail later.)

The circuit boards, covered by the front case 102 and the rear cover 108, are fixed to the front case 102 through the reinforcing plate 103 and are composed of a mother base plate 105 arranged in parallel with the front plane of the still video back 2, and various boards attached to the mother base plate 105 at right angle thereto (i.e. horizontally) and are electrically connected to the mother base plate 105. The various boards include (as viewed from the bottom) the first system control circuit board 111, a second system control circuit board 112, a recorded signal processing and reproduction circuit board 113, the first image pickup signal processing circuit board 114 and a second image pickup signal processing circuit board 115. Above the boards (in parallel) is a viewfinder board 116 to support the block of the optical relay viewfinder system 89 and an LCD board 117, located between the viewfinder board 116 and the floppy deck 49, which provides the output of the indication circuit 43.

The two system control circuit boards 111 and 112 support the power source circuit 92, the light measuring circuit 93, the flash control circuit 50 and others. The recorded signal processing and reproduction circuit 113 supports the Y signal processing circuit 61, the C signal processing circuit 62, the data multiplexing circuit 63, the mixer circuit 64, the recording circuit 65 and others.

The first image pickup signal processing board 114 supports a matrix circuit 67, while the second image pickup signal processing board 115 supports the process circuit 66, the system timing circuit 68 and the CCD driver circuit 36. A servo board 106 supports the servo circuit 40 and the driver circuit 41.

The LCD circuit board 117 supports the entire record section controller circuit 42, and the indication circuit 43.

A DC-DC converter 120 is part of the above-mentioned power source circuit 92.

As is apparent from the illustrations, the relay optical system 54 is located horizontally between the two image pickup signal processing circuit boards 114 and 115. The light for picture taking enters the front right side portion of the still video back 2, as viewed from the back, and strikes the CCD sensor at the front left side position of the still video back 2 via the optical system as described with reference to FIG. 4. To this end, the CCD board 118 for supporting the CCD sensor 55 is mounted to the left above the mother base plate 105 and between the two image pickup signal processing circuit boards 114 and 115.

Further, as was described earlier, the light receiving window 10 for white balance adjustment is located on the front plane of the still video back 2 in the vicinity of the floppy deck 49. With this arrangement, the light from the photographic object in front of the camera is detected to enable accurate white balance adjustment.

The viewfinder window 9 on the rear cover 108 faces the back of the viewfinder optical relay system 89. The upper portion of the LCD circuit board 117 consists of an opening L1 provided to form the display portion L on the rear cover 108 and an acrylic resin cover L2 covering the opening L1.

The back cover 110 is provided with an AE lock operating button 119.

Figure 6A:
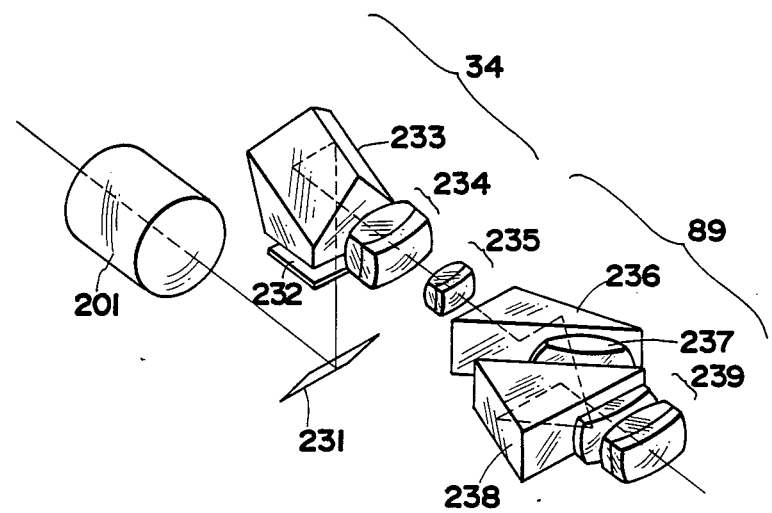
FIG. 6(a) is a perspective view of the viewfinder optical system of the embodiment.
Figure 6B:
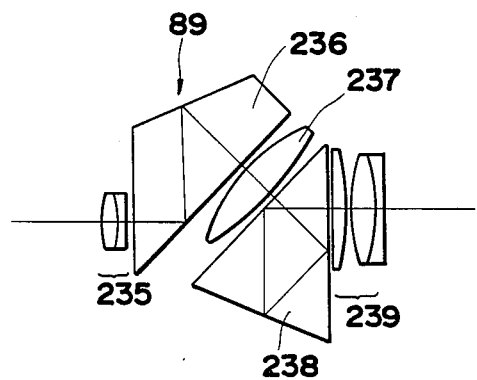
FIG. 6(b) is a vertical cross section view of the optical relay system of the viewfinder.

Next, explanation will be made about the construction of the optical viewfinder system. With reference to FIGS. 6(a) and 6(b), the optical system in the camera body 1 comprises an objective lens 201 (provided in an interchangeable lens), a quick return reflex mirror 231, a focusing plate 232, a pentagonal prism 233 and an eyepiece 234. The viewfinder optical relay system 89 in the still video back 2 has its front end facing the viewfinder window of the camera body 1 and comprises a viewfinder relay objective lens 235, a light path changing prism 236 (provided with a first delta-plane), a condenser lens 237, a second light path changing prism 238, and an eyepiece 239 for the viewfinder relay system.

The light from an object to be photographed passes through the objective lens 201 and is reflected by the quick return mirror 231 to focus on the focusing plate 232. The image on the focusing plate is introduced through the pentagonal prism 233, the eyepiece 234 and the viewfinder relay objective lens 235 and reimaged in the vicinity of the exit plane of the first light path changing prism 236. The image can be observed through the condenser lens 237, the second light path changing prism 238 and the viewfinder relay eyepiece lens 239.

Next, explanation will be made in detail about the internal structure and operation of the floppy deck 49 with reference to FIGS. 7 to 12. Those figures show only the floppy deck 49, and its relationship with the entire body of the still video back is not shown for the convenience of illustration and simplicity.

FIG. 7 is a partial cutaway perspective view of the floppy deck 49 with its cover open, which FIG. 8 is a perspective view of the magnetic disk. First, the structures shown in these figures are described.

The floppy deck 49 is composed of a deck body A and a deck cover B. The magnetic disk cassette on the cassette C to be inserted into the floppy deck 49 has a rotatable, circular magnetic disk mounted therein.

The structure of the deck body A will be described first.

As shown in FIG. 7, the spindle motor 302 secured on a base plate 301 is provided with a magnet on its spindle portion 302a to drive and rotate a magnetic disk in the magnetic disk cassette C (see FIG. 8) inserted in the floppy deck, with the magnet of the motor 302 attracting the center 304 of the magnetic disk.

A boss 303a located in the center of the front portion of the base plate 303 is used to locate the hole 305a in the cassette 305 of the magnetic disk C. Another boss (not shown) located on the rear right portion of the base plate 301 is used to guide the hole 305b of the cassette 305. A boss 303b located on the rear left portion of the base plate 301 is engaged by the edge 305c of the cassette 305. With these guides at two positions and an engagement at one point, the magnetic disk cassette C is positioned correctly in the magnetic disk device. A shutter 305b is provided on the cassette 305.

A guide shaft 306 is provided on the base plate 301 in parallel with the front edge of the base plate 301 to guide the head carriage 307 through which the guide shaft passes, such that the head carriage 307 slides along the shaft. The head carriage 307 has an L-shape and a magnetic head 308 which moves along a line parallel to the guide shaft 306 and passes the center (or axis of rotation) of the spindle motor 302.

Next, explanation will be made about the locking of the deck cover B in the closed position and the mechanism for opening the cover with reference to FIG. 7 and FIGS. 9 through 12.

A retaining lock member 339 pivots on one end of the guide shaft 306 to the side of the front top of the base plate 301. The retaining lock member 339 turns in the direction of arrow X2 when depressed by projection 340a on the upper cover 340 of the deck cover B as it closes.

An upper cover retaining lever 341a located on the left side close to the retaining lock member 339 and another upper cover retaining lever 341b located on the right side (opposite the left retaining lever 341a) are mounted on a connecting shaft 342 which pivots on the base plate 301 in parallel with the guide shaft 306. A projecting member 339a is combined with the retaining lock member 339 and carries a stopper pin 339b. The left side upper cover retaining lever 341a is formed with a retaining recess 343 with a wide V shape and an indent 344 to allow the escape of the stopper pin 339b. A tension spring 345 is placed between the lower end of the retaining lock member 339 and the lower end of the upper cover retaining lever 341a.

Figure 9:
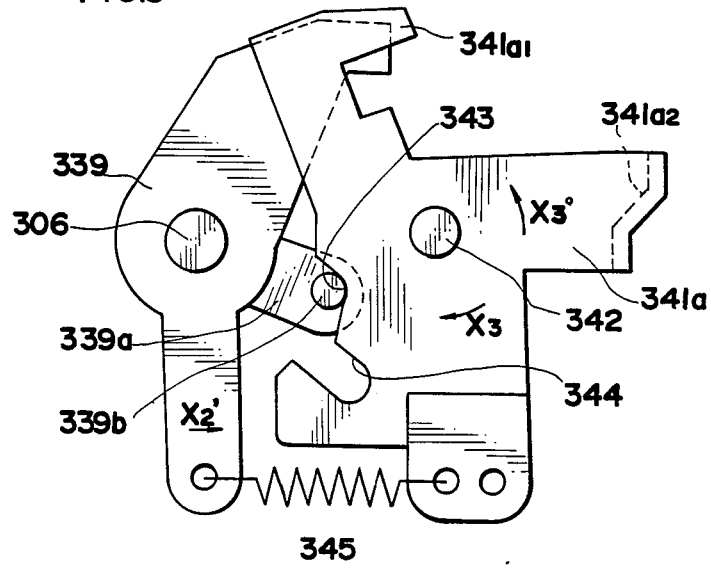
FIGS. 9 through 12 are explanatory illustrations showing the opening and closing operation of the deck portion.
Figure 11:
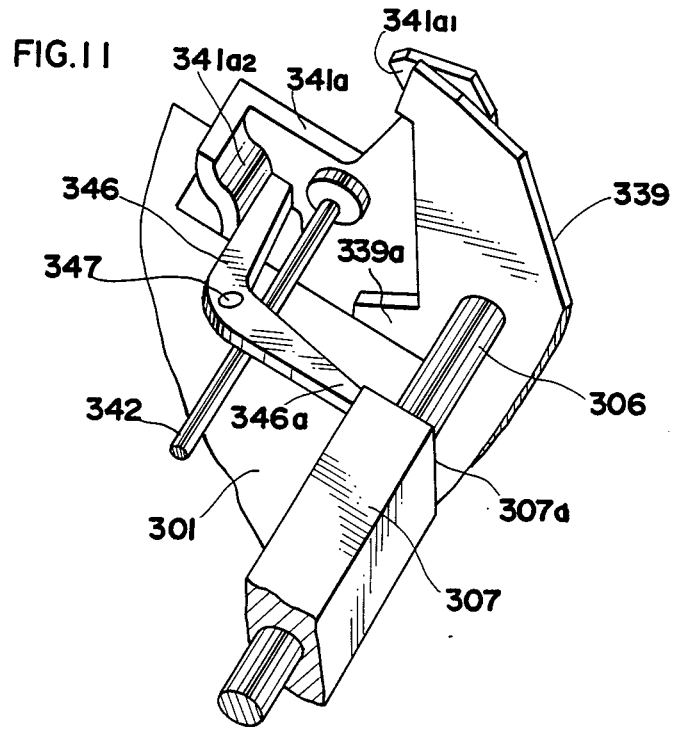

In the condition when the deck cover B is open, as shown in FIGS. 9 and 11, the stopper pin 339b on the retaining lock member 339 is held by the retaining recess 343 of the upper cover retaining lever 341a and the lower end of the retaining lock member 339 is forced by the tension of the spring 345 in the direction of arrow X2 about the guide shaft 306. On the other side, the lower end of the upper cover retaining lever 341a is forced in the direction of the arrow X3, rotating about the connecting shaft 342. Thus, the retaining lock member 339 and the upper cover retaining lever 341a lock each other in position.

Figure 10:
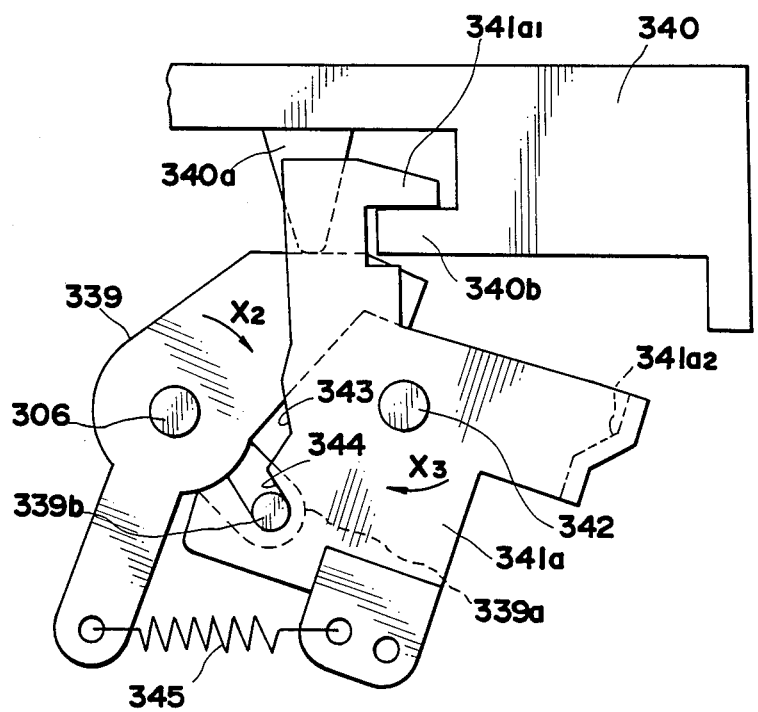
Figure 12:
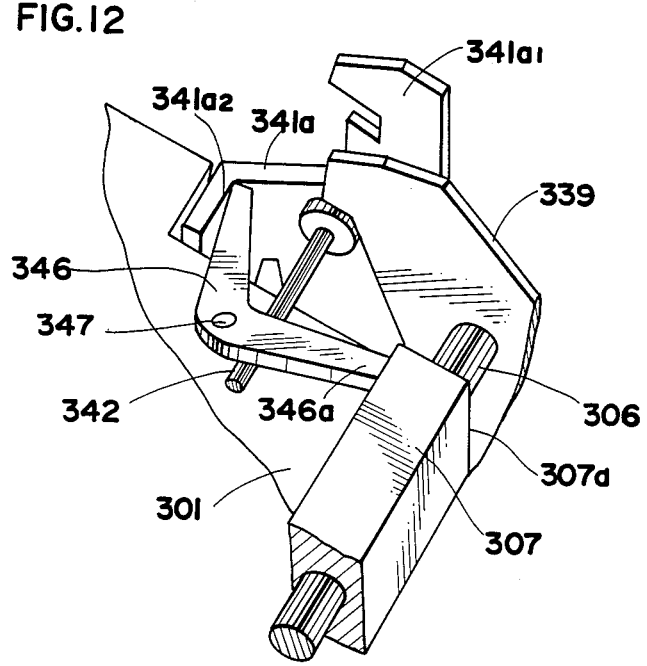

When the upper cover 340 is closed as shown in FIGS. 10 and 12, the projection 340a on the upper cover 340 causes the retaining lock member 339 to rotate about the guide shaft 306 in the direction of arrow X2. Then, the stopper pin 339b disengages from the retaining recess 343 and drops into the indent 344 to release both locks of the retaining lock member 339 and the upper cover retaining lever 341a.

With the release of the lock, the retaining lock member 339 rotates further in the direction of arrow X2 so that the upper cover retaining lever 341a is rotated by the tension spring 345 in the direction of arrow X3 about the connecting shaft 342. At this time, the portions to be retained 340b (only one is shown) on the left and right sides of the upper cover 340 respectively oppose the retaining projections 341a1 and 341b1 which restrain portions 340b on the upper cover 340 to hold the deck cover B in the closed position.

As shown in FIG. 7, the deck cover B comprises an upper cover 340 serving as the outer appearance and a cassette holder 349 for receiving the magnetic disk cassette C.

The upper cover 340 is hinged on shaft 351 on the bracket 350 provided on the main body A. The cassette holder 349 is also hinged on shaft 351. The cassette holder 349 is forced by a spring (not shown) in the open direction and its open position is limited by the bracket 350.

The upper cover 340 has an internal pad plate 352 with a pad 353 to define the vertical position of the magnetic disk in the magnetic disk cassette C which is inserted in the cassette holder 349. The pad plate 352 is also provided with a compulsory insertion spring 354 to forcibly insert the center core portion 304 of the magnetic disk against the spindle portion 302a of the spindle motor 302; a PG (pulse generator) coil 39; and a spring (or elastic) member (not shown) for forcing the cassette 305 of the magnetic disk cassette C towards the base plate 301 of the main body A. The upper cover 340 is provided with an elastic member (not shown) to force the pad plate 352 towards the base plate 301.

The pad plate 352 has two holes (not shown) to receive two bosses 356a and 356b located on the base plate 301 of the main body A with other bosses (not shown) coming into contact with the pad plate 352 such that the relative positions of the pad plate 352 and the main body A are defined upon closure of the upper cover 340.

Next, explanation will be made about the opening and closing operation of the deck cover B.

(1) The operation to open the deck cover B is as follows:

If the cassette eject button 12, interconnected with the left side upper cover retaining lever 341a is pushed when the 340b and 340b are held by the retaining projection 341a1 and 341b1 of the upper cover retaining lever 341a as shown in FIG. 10, the upper cover 340 is held in the closed position, and the magnetic head 308 is on any track of the magnetic disk, the upper cover retaining lever 341a begins to turn about the connecting shaft 342 in the direction of arrow X3 against the force of the tension spring 345.

(2) The operation to close the deck cover B is as follows: .

When a magnetic disk cassette C is inserted into the cassette holder 349, the shutter 305d of the magnetic disk cassette C is opened by a shutter operating mechanism provided in the cassette holder 349 and the magnetic disk cassette C is inserted in the cassette holder 349. If the upper cover 340 is closed in this condition, the magnetic disk cassette C is attached to the spindle motor 302 and at the same time positioned in place by bosses 303a and 303b and others not shown in the Figures, with the upper cover 340 being retained by the upper cover retaining levers 341a and 341b. At this time, the magnetic disk cassette C is forced against the spindle motor 302 by the compulsory insertion spring 354 and the center core portion 304 of the magnetic disk is attracted by the magnet of the spindle portion 302a. after the completion of the insertion of the magnetic disk cassette C, the compulsory insertion spring 354 releases the magnetic disk cassette C.

The above is an explanation of a general operation. The following is a more specific explanation of operation.

When the upper cover closing operation is started after magnetic disk cassette C is inserted in the cassette holder 349, the cassette holder 349 also starts its closing operation.

As shown in FIG. 10, the projection 340a on the upper cover 340 pushes the retaining lock member 339 so that it turns in the direction of arrow X2. As a result, the stopper pin 339b comes out of the retaining recess 343 and drops into the indent 344 and the upper cover retaining lever turns in the direction of arrow X3 under the force of the tension spring 345. After that, the stopper pin 339b of the retaining lock member 339 that was pushed by the projection 340a on the upper cover, drops into the indent 344 of the upper cover retaining lever 341a and is forced by the tension spring to the position shown in FIG. 10 and stops there to lock the upper cover at its closed position. In the above embodiment, the mechanism is arranged such that the initial position setting lever 346 pushes and displaces the end portion 307b of the head carriage 307. The mechanism may be constructed so that the initial position setting lever 346 pulls the front end of the head carriage 307.

Next, explanation will be made about the structure and operation to attach the still video back 2 to the camera body 1.

Figure 13:
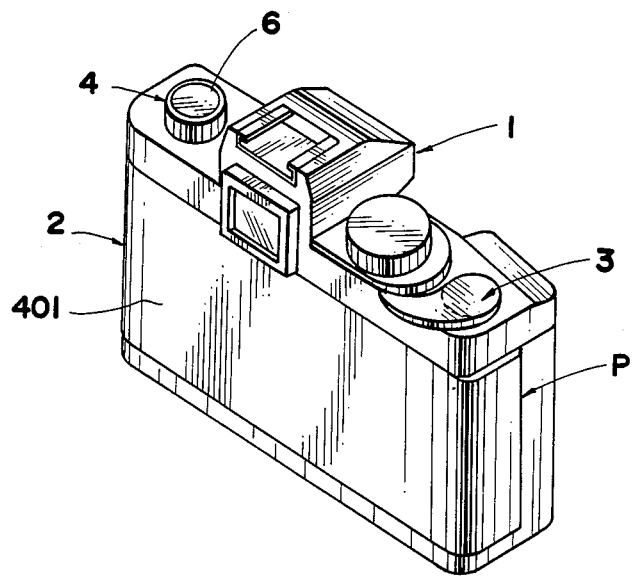
FIG. 13 is a perspective view of a camera to be used with the still video adapter according to the present embodiment.

When the rewinding knob 6 is pulled up when a normal rear cover 401 is attached to the camera body 1 as shown in FIG. 13, the rear cover 401 is opened. If the connection at the rear cover hinge portion, provided inside the portion indicated by P, in the Figure is released or unlocked, the rear cover 401 is removed.

Figure 14:
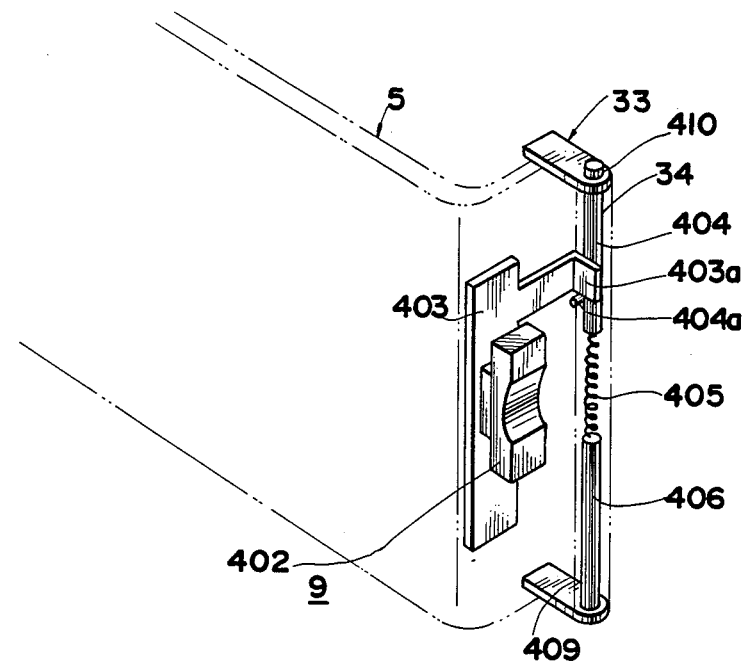
FIG. 14 is a perspective view of the main structure showing the mechanism for attachment of the still video adapter according to the present embodiment.

Then, the still video back may be attached. As shown in FIG. 14, the still video back 2 is provided at one end (at the right side end as viewed from the back of the still video back) with an attaching/detaching lever 402 which can slide vertically. An arm 403a extending from a plate member fixed to the lever 402 engages a pin 404a carried by a coupling shaft 404 which is arranged to slide vertically. The coupling shaft 404 is forced upwards by a spring 405 to force pin 404a against the arm 403a so that both the plate member 403 and the lever 402 are forced upward.

A coaxial fixed shaft 406 is connected with the coupling shaft 404.

Figure 15:
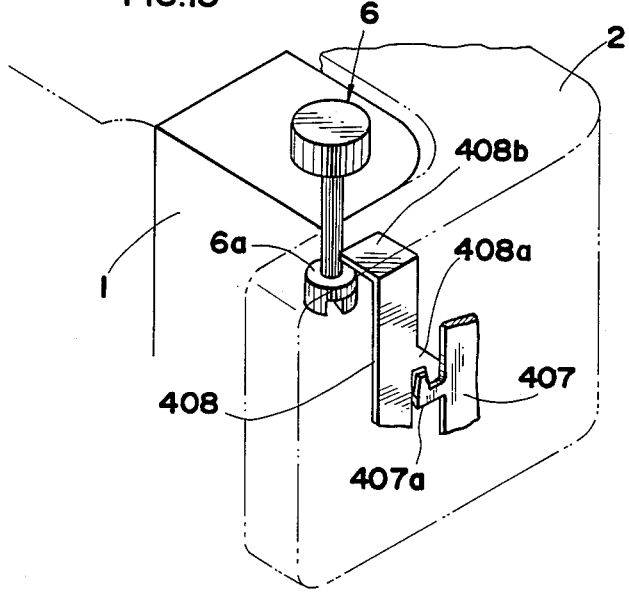
FIG. 15 is a perspective view of the main structure showing the mechanism for attachment of the still video adapter according to the present embodiment.

As shown in FIG. 15, the other end of the still video back 2 is provided with a lock plate 407 with an arm 407a that extends vertically. Inside the camera body 1 opposite the lock plate 407 is a rear cover lock lever 408 having an arm 408 extending downward which can slide vertically.

Figure 16:
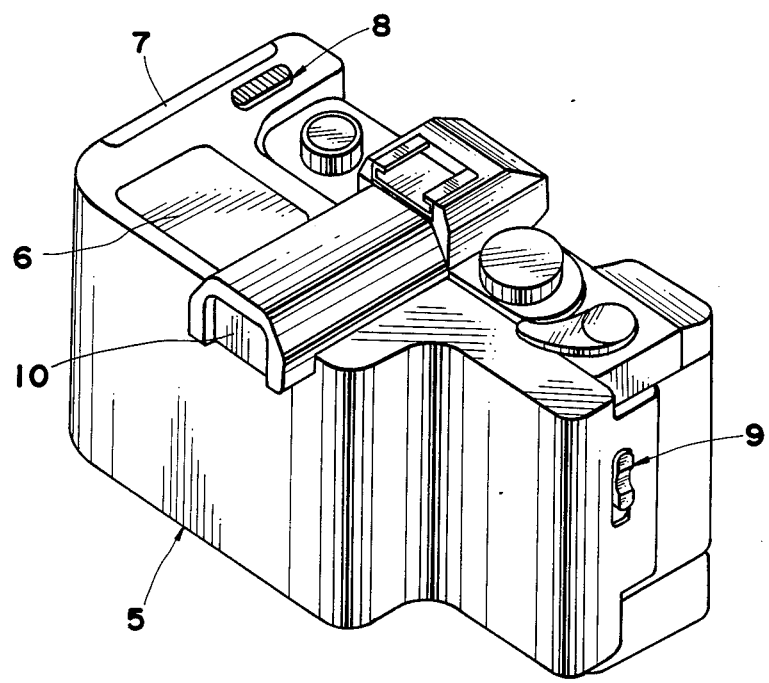
FIG. 16 is a perspective view showing the still video adapter coupled to the camera body.
Figure 17:
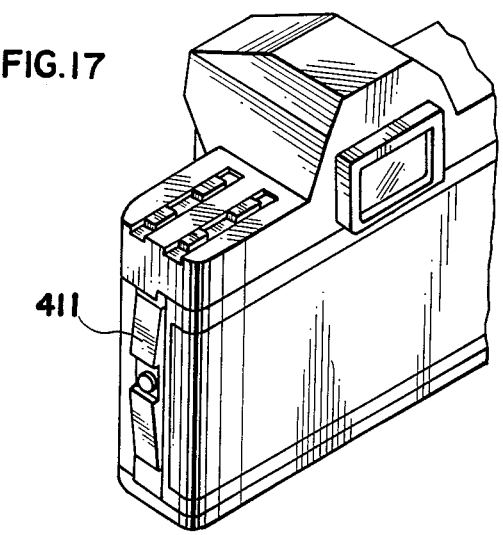
FIG. 17 is a partial perspective view showing another example camera.

With these structures, the lower end of the fixed shaft 406 is inserted into the bearing 409 of the camera body 1, the lever 402 is pushed down against the force of the spring 405, the upper end of the coupling shaft 404 is engaged with another bearing 410 of the camera body 1, and the lever is released. The still video back 2 has been connected to the camera body 1. Then the still video back 1 may be pivoted about the coupling shaft 404 in the same way the normal camera rear cover is closed, so that the arm 407a of the lock plate 407 pushes down the rear cover lock lever 408 against the force of a spring with the arms 407a and 408b engaging each other to complete the attachment, as shown in FIG. 16.

As the floppy deck 49 is located opposite the lever 402, the still video back can be attached to the camera body by a simple structure and operation.

To detach the still video back 2 from the camera body 1, the rewinding knob 6 is pulled up first, as in the case of removing the normal rear cover 401. Then, the upper plane of the rewinding fork 6a provided integrally with the rewinding knob 6 pushes up the angle 408b of the rear cover lock lever 408 and lifts it to disengage the arm 408a from arm 407a. Next, the lever 402 is pushed down against the force of the spring to disengage the upper end of the coupling shaft 404 and enable removal of the still video back from the camera body 1.

In the case of a camera with a built-in automatic rewinding device, the rewinding knob as in the above embodiment is not provided. Instead a lock release knob 411 is provided at one side of the camera body 1 to open the rear cover. When the still video back of the above described embodiment is coupled to a camera of this type, the lock release knob 411 will be obstructed by the still video back and lock release is not possible.

Figure 18:
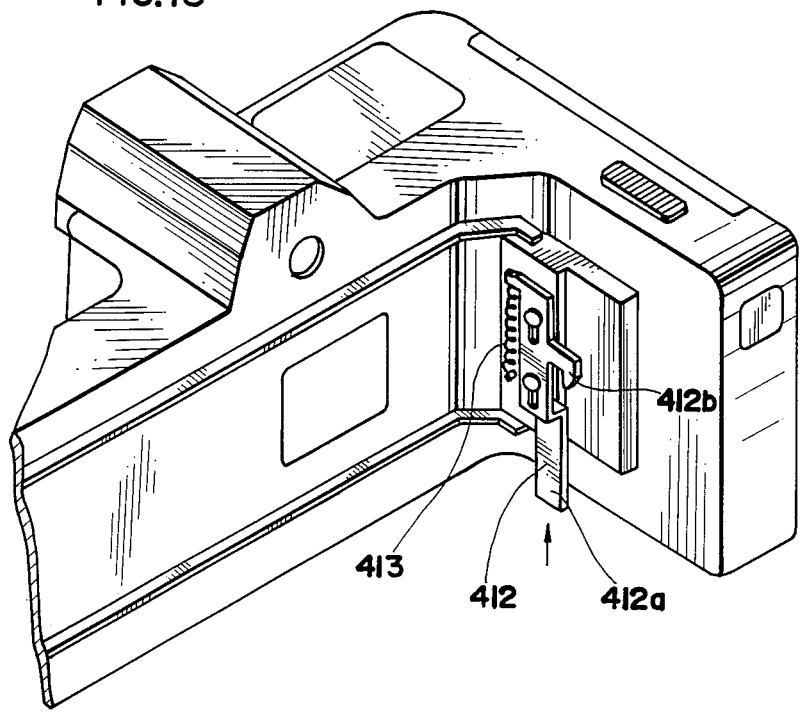
FIG. 18 is a partial perspective view showing a modification of the still video adapter so it can be used with the camera shown in FIG. 17.

FIG. 18 shows a modification of the still video camera that has a lock releasing mechanism adapted to such a type of camera.

In this structure, the lock plate 412 of the still video back can slide vertically and is forced downward by a spring. The lock plate 412 has its bottom end projecting from the bottom of the still video back to serve as a release 412a. The lock plate also has an arm 412b extending downward. The camera body is provided with a lock plate (not shown) having an arm extending upward. Engagement of these arms with each other achieves locking which is released by the release 412a being pushed up to disengage the arms from each other. Although the lock plate 412 in FIG. 18 is forced downward with the release 412a projecting from the bottom, the direction may be reversed. In that case, the extension of the arms will also be reversed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A still video adapter to be attached to a camera body of a standard photographic still picture camera normally used with a silver halide film, in place of a rear cover of said camera, said still video adapter comprising:
    an image pick-up means for opto-electrically converting an image of an object into a picture signal;
    a recording medium on which the picture signal is recorded; and
    a recording means, provided at one side section of said still video adapter and extended to forward of said still video adapter, for recording the picture signal onto said recording medium.

2. A still video adapter of claim 1, wherein said side section has an opening which is provided on top surface thereof and through which said recording medium is detachably loaded.

3. A still video adapter of claim 1, wherein said camera includes a hinge portion through which said camera rear cover and said still video adapter are selectively attached to said camera body, and said still video adapter further comprising attachment means to be engaged with said hinge portion of said camera body and provided at a portion opposite to said side section.

4. A still video adapter of claim 1 further comprising a viewfinder optical relay system to be optically connected to an eyepiece of said camera body; and a display means located between position of said viewfinder optical relay system and position of said recording means.

5. A still video adapter of claim 1 further comprising a photographic optical relay system with its entrance to be faced with an exposure window of the camera body.

6. A still video adapter of claim 5 wherein said photographic optical relay system includes a reflecting portion for reflecting the photographic optical axis sideways.

7. A still video adapter of claim 6 further comprising a circuit block including a signal processing circuit located under said photographic optical relay system.

8. A still video adapter of claim 5 further comprising a first circuit board located in front of said photographic optical relay system and in parallel with the front surface of said still video adapter; and a second circuit board connected to said first circuit board and located perpendicular to said first circuit board and below said photographic optical relay system.

9. A still video adapter of claim 1 further comprising a light receiving means for generating a control signal used for white balance adjustment, the light receiving window thereof being located on the front surface of said side section carrying said recording means.

10. An adapter which, when attached to a camera body of a standard photographic still picture camera, record picture images obtained through said camera body to a recording medium machine readable for future reproduction and viewing, comprising:
    optical means receiving said images from at least part of an exposure window of said camera body;
    opto-electrical conversion means for converting said images into electrical signals; and
    recording means for receiving and recording said electrical signals to said recording medium.

11. The adapter of claim 10 in which said recording medium is a magnetic disk detachably housed in a magnetic deck as said recording means.

12. The adapter of claim 11 in which said deck has a smallest dimension and is mounted such that said smallest dimension extends substantially horizontally over one side of said adapter, when said camera is held in an upright position.

13. The adapter of claim 10, further comprising a main circuit board oriented to be substantially perpendicular to an optical axis of said camera body and a plurality of circuit boards electrically connected to said main circuit board and extended perpendicularly to said main circuit board.

14. The adapter of claim 13 in which said optical means is mounted between two of said plurality of circuit boards.

15. The adapter of claim 10 in which removing a rear cover of said camera allows attachment of an optical function back, performing at least one of the functions of data imprinting, interval timer exposure, and exposure calculation, to be attached to said camera body, and in which said adapter is attached to said camera body in identical manner as said optional back.

16. The adapter of claim 15 in which a bottom surface of said camera body allows attachment of an automatic winding device to be attached and in which said adapter receives power from a battery case attaching to said camera body in identical manner as said automatic winding device, further in which a bottom surface of said battery case allows attachment of said automatic winding device to be attached to said battery case in identical manner as said automatic winding device attached to said camera body.

17. A battery case for use in a still video camera system including a camera body of a standard photographic still picture camera and a still video back detachably mounted to said camera body in place of a rear cover of said camera body, said battery case comprising:
    an attachment portion to be engaged with a tripod screw hole of said camera body; and
    a power supply terminal through which power of said battery case is to be supplied to said still video back, said still video back including a power terminal receiving the power through said power supply terminal when said still video back and battery case are attached to said camera body.

18. A battery case of claim 17, wherein said camera system further includes a flash device attached to said camera body and capable of data transmission to said still video back with said camera body and still video back including data terminals used for the flash data transmission respectively, the flash data transmission being made through said camera body and battery case.

19. A battery case of claim 17, wherein said camera system further includes an automatic winding device having an attachment portion to be engaged with said tripod screw hold of said camera body, a driving shaft to be engaged with a winding shaft of said camera body, and a tripod screw to be engaged with said tripod screw hole of said camera body, and said better case further comprising a tripod screw hole to be engaged with said tripod screw of said automatic winding device; and an interconnection shaft to be interconnected with said winding shaft of said camera body and said driving shaft of said automatic winding device respectively.

* * * * *

UNITED STATES PATENT AND TRADEMARK OFFICE
CERTIFICATE OF CORRECTION

PATENT NO. : 4,862,293
DATED : August 29, 1989
INVENTOR(S) : Mitsuru Saito et al It is certified that error appears in the above-identified patent and that said Letters Patent is hereby corrected as shown below:

Claim 37, line 2, replace "optical" with --optional--.

Signed and Sealed this

Seventeenth Day of April, 1990

Attest:

HARRY F. MANBECK, JR.

*Attesting Officer*        *Commissioner of Patents and Trademarks*